March 2, 1971     T. WILHARM     3,567,316
MOTION PICTURE CAMERA
Filed Aug. 4, 1969
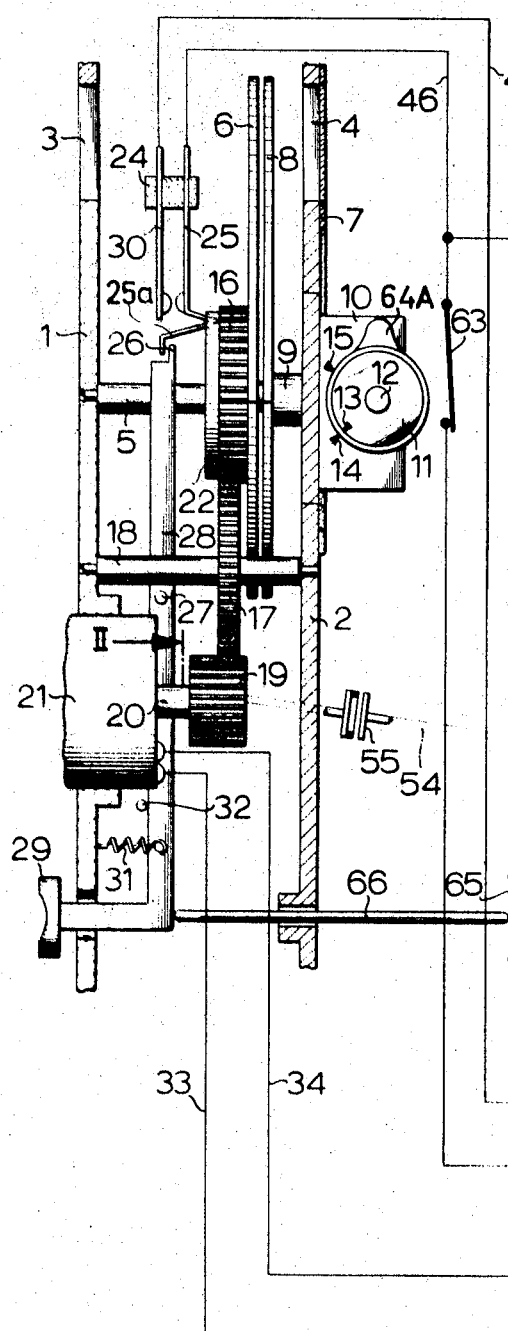
INVENTOR:
THEO WILHARM
BY *[signature]*
his ATTORNEY

3,567,316
MOTION PICTURE CAMERA
Theo Wilharm, Geradstetten-Hebsack, Germany, assignor to Robert Bosch Elektronik und Photokino G.m.b.H., Stuttgart-Unterturkheim, Germany
Filed Aug. 4, 1969, Ser. No. 847,006
Claims priority, application Germany, Aug. 6, 1968,
P 17 97 031.9
Int. Cl. G03b 1/62, 21/36
U.S. Cl. 352—91                                                          10 Claims

ABSTRACT OF THE DISCLOSURE

A motion picture camera wherein the shutter is driven by an electric motor which is started in response to depression of a pushbutton and continues to drive the shutter on release of the pushbutton until the shutter assumes its closed position. The motor circuit includes a disconnecting switch which is closed by the pushbutton and opens only on release of the pushbutton and upon completed rotation of the shutter to its closed position. One or more arresting switches in the motor circuit can be opened independently of the pushbutton to automatically arrest the motor but only when the shutter assumes its closed position. This is achieved by the provision of a control switch which bypasses the arresting switches and is closed on release of the pushbutton to thus complete the motor circuit until the disconnecting switch opens.

BACKGROUND OF THE INVENTION

The present invention relates to motion picture cameras in general, and more particularly to improvements in a drive which operates the shutter of a motion picture camera and includes an electric motor. Still more particularly, the invention relates to improvements in devices which serve to insure that the electric drive for the shutter of a motion picture camera is arrested when the shutter is closed and prevents scene light from reaching an exposed or unexposed film frame in the camera body.

Closing of the shutter in idle position of the camera motor is especially important when the shutter performs one or more additional functions, for example, to direct light against a photosensitive receiver of the exposure control and/or into the viewfinder of the motion picture camera. In such cameras, the shutter is normally provided with a mirror serving to reflect some scene light which enters by way of the camera objective whereby the thus reflected light impinges on the photosensitive element and/or is directed into the viewfinder. Stoppage of the shutter in open or partly open position would prevent scene light from reaching the viewfinder and/or the photosensitive element so that the exposure meter of the camera could not react to changes in scene brightness.

Patent No. 3,265,458 to Easterly discloses a motion picture camera wherein the electric motor which drives the shutter continues to run until the shutter closes regardless of whether the user releases the starter button in open or closed position of the shutter. This is achieved by the provision of a disconnecting switch which is closed by a revolving cam and can open only when the cam assumes an angular position which corresponds to closed position of the shutter. This prevents overexposure of the last film frame which was exposed to scene light. Such overexposure would be unpleasant to the eye during projection of the motion picture film.

Problems arise when the motion picture camera must be provided with one or more arresting switches which serve to open the motor circuit independently of the starter knob. The aforementioned disconnecting switch is then unable to insure operation of the motor until the shutter assumes its closed position. Arresting switches are employed, for example, when the camera is provided with a device which can produce the well-known fade-in or fade-out effect. Thus, an arresting switch should automatically arrest the motor upon completion of fade-out and upon completed rewinding of that part of motion picture film which was exposed during fade-out so that the same part of film can be exposed during fade-in.

SUMMARY OF THE INVENTION

An object of the invention is to provide a motion picture camera wherein the shutter is driven by an electric motor and to provide the electric circuit of the motor with novel and improved means for automatically effecting movement of the shutter to closed position independently of the fact that the starter device for the motor is released at a time when the shutter is in partly open position and also independently of whether such release of the starter device takes place during fade-in, fade-out, rewinding of film and/or during normal operation of the camera.

Another object of the invention is to provide a motion picture camera wherein the shutter is automatically closed even if the motor circuit comprises one or more arresting switches which can open the motor circuit independently of the disconnecting switch.

A further object of the invention is to provide a motion picture camera wherein the circuit of the electric motor which drives the shutter is designed to insure closing of the shutter upon completion of one or more normal exposures and/or upon completion of exposures while the camera is set to produce one or more special effects, particularly fade.

The invention is embodied in an electric drive which can move the shutter of a motion picture camera to and from a predetermined position, preferably to and from a closed position in which the shutter prevents scene light from reaching a film frame. The drive comprises an electric motor which is connected with the shutter by a gear train or the like, an energy source (e.g., a battery), a disconnecting switch in circuit with the motor and with the energy source, starter means actuatable (preferably by hand) to close the disconnecting switch, means (for example, a projection which moves with the shutter) for effecting opening of the disconnecting switch on termination of actuation of the starter means in the predetermined position of the shutter, arresting means including at least one arresting switch in circuit with the motor, opening means (e.g., a diaphragm adjusting device or a timer mechanism) for effecting opening of the arresting switch independently of the starter means, and control switch means operative to bypass the arresting switch in response to termination of actuation of the starter means so that the motor continues to move the shutter when the arresting switch is open as long as the disconnecting switch remains in closed position.

The control switch is preferably actuated by a mechanical motion transmitting device which closes the control switch or permits the control switch to close in response to termination of actuation of the starter means whereby the arresting switch remains ineffective (i.e., it cannot cause stoppage of the motor) until the disconnecting switch opens in response to movement of the shutter to its predetermined position. This insures that the shutter assumes such predetermined position irrespective of whether the motor circuit is opened by the disconnecting switch while the arresting switch is closed or while the arresting switch is open.

The novel features which are considered as characteristic of the invention are set forth in particular in the appended claims. The improved electric drive itself, however, both as to its construction and its mode of operation together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic fragmentary sectional view of a motion picture camera which embodies the electric drive of my invention; and FIG. 2 is a sectional view as seen in the direction of arrows from the line II—II of FIG. 1.

DESCRIPTION OF THE PREFERRED EMBODIMENTS

The drawing shows a portion of a motion picture camera which includes two parallel panels or walls 1, 2 located in the front section and each forming part of the camera housing or body. These walls are respectively provided with registering light-admitting openings or windows 3, 4 and support a shaft 5 which carries a disk-shaped shutter 6. The latter is located between the walls 1, 2 and has a suitable cutout 6a (FIG. 2) which permits scene light to pass through the window 4 and to reach that frame of the motion picture film 7 which is located behind the window 4. The mechanism for transporting the film 7 is not shown in its entirety; such mechanism comprises a prime mover here shown as a reversible electric motor 21 mounted in the wall 1.

As seen from FIG. 1 the motion picture camera comprises a vane 8 which is coaxial with and is located behind the shutter 6. The vane 8 is attached to a hollow shaft 9 which surrounds the shaft 5 and normally rotates therewith to drive the vane 8 with the shutter 6. However, the vane 8 is adjustable with reference to the shutter 6 so that it may overlie a desired part of the cutout 6a. To this end, the camera comprises a customary adjusting mechanism which is accommodated in a box 10 and includes a transmission capable of turning the shaft 9 and the vane 8 with reference to the shaft 5. The box 10 is mounted at the rear side of the wall 2 and the transmission therein is adjustable by means of a shaft 12 which is secured to a knob 11. The latter is accessible at the outer side of the camera body and is provided with an index 13 which can be moved into registry with markers 14, 15 provided on the camera body (or on the box 10 if the latter is observable from the outside of the camera). When the index 13 registers with the marker 14, the vane 8 defines an aperture of maximum size, i.e., the vane is then preferably fully concealed behind the shutter 6 so that the amount of scene light which reaches a film frame depends exclusively on the speed of film transport and on the size of the cutout 6a. If the knob 11 is rotated in a clockwise direction, as viewed in FIG. 1, the index 13 travels toward the marker 15 whereby the angular position of the vane 8 with reference to the shutter 6 changes in such a way that the vane overlies a gradually increasing portion of the cutout 6a and the cutout 6a is fully overlapped when the index 13 registers with the marker 15. The camera is then incapable of admitting scene light to the film 7. The construction of the transmission in the box 10 is well known in the art and no claim is laid to the details thereof. The movements of the vane 8 between the fully open position of FIG. 1 and the fully closed position (when the index 13 registers with the marker 15) are utilized when the operator of the camera wishes to produce the well known fade, i.e., gradual transition at the start or at the end of a scene or an overlapping of a portion of a preceding scene by a portion of the next-following scene.

The transmission which drives the shaft 5 for the shutter 6 and vane 8 comprises a gear train including a gear 16 which is affixed to the shaft 5 and/or shutter 6, an intermediate gear 17 meshing with the gear 16 and mounted on a shaft 18 which is journalled in the walls 1, 2, and a pinion 19 meshing with the gear 17 and fixed to the output shaft 20 of the aforementioned reversible motor 21. The gear 16 is formed with a concentric ring-shaped projection or rib 22 having a radially extending recess 23 (see particularly FIG. 2). The recess 23 receives the elastic movable contact 25 of a disconnecting switch 24 which is in circuit with the motor 21 and further comprises a second contact 30. The contact 25 tends to move away from the contact 30 and to thus open the switch 24; however, such opening of the switch 24 is possible only when the recess 23 of the rib 22 is in registery with the contact 25. This takes place in that angular position of the shutter 6 in which the cutout 6a of the shutter is away from registry with the windows 3 and 4 so that the shutter cannot admit scene light to the film 7 regardless of the position of the vane 8 with reference to the cutout 6a.

The movable contact 25 of the disconnecting switch 24 is provided with a bent-over tongue 25a which extends into the path of movement of a motion transmitting or actuating tooth 26 provided at the free end of one arm of a two-armed starter lever 28 which is fulcrumed in the camera housing, as at 27, and whose other arm extends from the camera housing and is provided with a depressible pushbutton 29. A helical return spring 31 operates between the other arm of the starter lever 28 and the wall 1 to normally hold the lever in abutment with a fixed stop 32. When the lever 28 engages the stop 32 under the action of the return spring 31, the pushbutton 29 assumes its extended or outermost position and the tooth 26 is held away from the tongue 25a of the contact 25 so that the latter is free to enter the recess 23 as soon as the shutter 6 assumes the required angular position in which it prevents scene light which enters by way of the window 3 from passing through the window 4 and from reaching the film frame behind the wall 2. When the pushbutton 29 is depressed, the tooth 26 automatically withdraws the contact 25 from the recess 23 and causes it to engage the contact 30 to thereby close the disconnecting switch 24. The height of the rib 22 (as considered in the axial direction of the shaft 5) is such that, when the rib is adjacent to the contact 25, the latter remains in engagement with the contact 30 even if the pushbutton 29 is released, i.e., even if the starter lever 28 returns into abutment with the stop 32. This insures that the disconnecting switch 24 remains closed until the shutter 6 reasumes its starting position in which the cutout 6a is away from registry with the window 4.

The circuit of the motor 21 further includes two conductors 33, 34 which are connected to the movable contacts 35, 36 of a reversing switch including two coupled two-way switch having a common actuator knob 37. The knob 37 is biased by a suitable spring (not shown) so that it tends to assume the position shown in FIG. 1 in which the motor 21 is ready to transport the film 7 in a forward direction. The direction of rotation of the motor 21 is reversed when the knob 37 is depressed so that the movable contact 35 moves away from the fixed contact 39 and engages the fixed contact 38 and that the movable contact 36 moves away from the fixed contact 41 and engages the fixed contact 40 of the reversing switch. A conductor 42 connects the fixed contact 38 with one pole of an energy source here shown as a battery 43. A further conductor 44 connects the conductor 42 with the fixed contact 41. The fixed contact 39 is connected with one terminal of the disconnecting switch 24 by a conductor 45, and a conductor 46 connects the other terminal of the switch 24 with one terminal of a first arresting switch 47. The latter can open the circuit of the motor 21 independently of the disconnecting switch 24. The movable contact 48 of the arresting switch 47 is elastic and bears against the periphery of a rotary timer cam 49 having a notch 50 which receives a portion of the contact 48 when the arresting switch 47 is open. The cam 49 is mounted on the disk 52 of a timer mechanism 51 whose input shaft 53 is driven by the motor 21 by way of a gear train or a like transmission indicated by phantom lines, as at 54. A clutch 55 is installed in the transmission 54 and can be engaged by hand in a well known manner to start the timer mechanism 51 when the motor 21 is on. The purpose of the timer mechanism 51 is to automatically arrest the motor during fade-out or during backward transport of film 7 subsequent to fade-out and prior to fade-in. The transmission 54 preferably receives motion from the pinion 19 on the output shaft 20 of the motor 21. FIG. 1 illustrates the timer mechanism 51 in its starting or idle position from which the cam 49 must be rotated through an angle of about 270 degrees in order to effect opening of the arresting switch 47. In such idle position of the timer mechanism 51, the arresting switch 47 is closed because its fixed contact 56 is engaged by the movable contact 48. The other terminal of the switch 47 is connected with the other pole of the battery 43 by a conductor 57. A conductor 58 which branches from the conductor 57 is connected with one terminal of a second arresting switch 59 which includes a movable contact 60 and a second contact 61. The movable contact 60 extends into the notch 50 of the timer cam 49 in idle position of the timer mechanism 51 so that the arresting switch 59 is then open. The latter switch is always closed when the switch 47 is open and vice versa; however, the cam 49 can maintain both arresting switches in closed positions. The other terminal of the second arresting switch 59 is connected with the contact 40 of the reversing switch by a further conductor 62.

The circuit of the motor 21 further comprises a third arresting switch 63 which is installed in the conductor 46 and normally assumes the illustrated closed position. This switch is opened in automatic response to such angular displacement of the knob 11 that the index 13 registers with the marker 15, i.e., the switch 63 opens when the vane 8 cooperates with the shutter 6 to prevent entry of scene light into the window 4. It will be noted that the third arresting switch 63 is in series with the disconnecting switch 24 and with the first arresting switch 47.

The just described circuit includes two oppositely poled subcircuits for the motor 21. The first subcircuit whose completion causes the motor 21 to transport the film 7 in a forward direction is completed in response to depression of the pushbutton 29 provided that the knob 37 of the reversing switch is permitted to remain in the illustrated position. The second subcircuit is completed in response to simultaneous depression of the pushbutton 29 and knob 37. The first subcircuit includes the arresting switches 47 and 63; the switch 47 opens automatically when the motor 21 is rotated in a forward direction and the clutch 55 is engaged to effect rotation of the cam 49 in a counterclockwise direction, as viewed in FIG. 1. Such opening of the arresting switch 47 takes place when the notch 50 of the cam 49 moves into registry with the movable contact 48. The movable contact 60 then engages the periphery of the cam 49 so that the second arresting switch 59 is closed.

When the knob 37 is depressed simultaneously with the pushbutton 29, the motor 21 rotates in a direction to transport the film 7 rearwardly by way of a customary claw pull-down which forms part of the aforementioned film transporting mechanism but has been omitted for the sake of clarity. If the operator of the camera engages the clutch 55 while the motor 21 rotates in reverse, the transmission 54 operates the timer mechanism 51 to rotate the cam 49 in a clockwise direction whereby the first arresting switch 47 closes and the second arresting switch 59 opens automatically as soon as the notch 50 returns to the illustrated position. The delay with which the arresting switch 59 opens is determined by the setting of the timer mechanism 51.

In the absence of any provision to the contrary, the motor 21 would be arrested automatically in response to opening of one or more arresting switches (47, 59, 63) even when the disconnecting switch 24 is closed, i.e., even if the movable contact 25 of the switch 24 engages the rib 22 of the gear 16. This would mean that the shutter 6 could not return to its starting position in which the contact 25 extends into the recess 23. In order to avoid such premature stoppage of the motor 21, the circuit of FIG. 1 further comprises a bypass connection comprising a conductor 64 which connects the conductor 46 with the other pole of the battery 43 and contains a normally closed control switch 65 whose movable contact is located in the path of a motion transmitting push rod 66 which is displaced in automatic response to depression of the pushbutton 29 to thereby open the control switch 65. The spring which urges the movable contact of the control switch 65 to the illustrated closed position has been omitted for the sake of clarity. This movable contact is mechanically connected with the movable contact of an auxiliary switch 67 in the conductor 57. The auxiliary switch 67 opens when the control switch 65 closes, and vice versa. It will be readily understood that the motor 21 will continue to run if the disconnecting switch 24 remains closed at the time when the pushbutton 29 is released because the motor circuit is then completed by way of the control switch 65 which closes automatically in response to movement of the pushbutton 29 to the illustrated position. The switch 24 then insures that the motor 21 remains on until the movable contact 25 enters the recess 23 to arrest the motor in a position corresponding to starting or closed position of the shutter 6. Such operation is insured despite the fact that the arresting switch 47, 59 and/or 63 might be open when the pushbutton 29 is released.

The operation:

In order to start the motor 21 in a forward direction, the user of the camera leaves the knob 11 in the illustrated position so that the vane 8 remains in fully open position. The user depresses the pushbutton 29 to close the disconnecting switch 24 by way of the starter lever 28, its tooth 26 and movable contact 25. Thus, the contact 25 moves away from the recess 23 and engages the fixed contact 30 of the disconnecting switch 24. The push rod 66 opens the control switch 65 in response to depression of the push-button 29 and the switch 65 closes the auxiliary switch 67. The motor circuit is then completed from the other pole of the battery 43, through the auxiliary switch 67, conductor 57, closed arresting switch 47, conductor 46, closed arresting switch 63, closed disconnecting switch 24, conductor 45, contacts 39, 35 of the reversing switch, conductor 33, the corresponding winding of the motor 21, conductor 34, contacts 36, 41 of the reversing switch, conductor 44 and to the one pole of the battery. The motor 21 drives the shutter 6 and vane 8 by way of the gear trains 19, 17, 16. As stated before, the cutout 6a is fully open (i.e., the vane 8 is fully overlapped by the shutter 6) when the index 13 of the knob 11 registers with the marker 14.

If he wishes to arrest the motor 21, the user simply releases the bushbutton 29 whereby the spring 31 contacts and causes the starter lever 28 to move its tooth 26 away from the movable contact 25 of the disconnecting switch 24. At the same time, the spring-biased movable contact of the control switch 65 returns the push rod 66 to the illustrated position so that the switch 65 closes and opens the auxiliary switch 67. The motor 21 is arrested without delay and remains arrested if the movable contact 25 happens to be in registry with the recess 23 at the exact moment when the user releases the pushbutton 29. However, if the pushbutton 29 is released when the movable contact 25 overlies the rib 22 of the gear 16, the disconnecting switch 24 cannot open and continues to complete the motor circuit from the other pole of the battery 43, through the control switch 65 and conductors 64, 46, closed disconnecting switch 24, conductor 45, contacts 39, 35, conductor 33, motor 21, conductor 34, contacts 36, 41, conductor 44 and to the one pole of the battery. The motor 21 is thus started again as soon as the control switch 65 closes and continues to run until the movable contact 25 enters the recess 2 to arrest the motor at a time when the shutter 6 assumes its closed position and prevents entry of light into the window 4 irrespective of the position of the vane 8.

If the user wishes to produce a fade-out and thereupon a fade-in in such a way that the first part of the next-following scene is superimposed on the last part of the preceding scene, the camera is operated as follows: The motor 21 is started in a forward direction in the aforedescribed manner and the user engages the clutch 55 when he desires the fade-out to begin. The transmission 54 then drives the timer mechanism 51 and the latter drives its cam 49 in a counterclockwise direction to close the second arresting switch 59 and to move the notch 50 toward registry with the movable contact 48 of the first arresting switch 47. At the same time, the user slowly turns the knob 11 in a clockwise direction, as viewed in FIG. 1, to gradually close the cutout 6a by turning the revolving vane 8 with reference to the revolving shutter 6 until the index 13 moves into registry with the marker 15 whereby the lobe 64A of the knob 11 automatically opens the third arresting switch 63. Such opening of the switch 63 takes place when the vane 8 fully overlaps the cutout 6a of the shutter 6. The motor 21 is arrested when the pushbutton 29 is released and remains idle if the release of the pushbutton 29 takes place at the exact moment when the movable contact 25 of the disconnecting switch 24 registers with the recess 23 of the rib 22. Otherwise, the motor 21 is started again as soon as the control switch 65 closes because the motor circuit is then completed in the aforedescribed manner through the switches 24, 65 until the recess 23 reaches the movable contact 25 and permits the switch 24 to open in closed position of the shutter 6. It will be noted that the user of the camera can hold the motor 21 at a standstill even if the movable contact 25 is not aligned with the recess 23; the user simply continues to press the pushbutton 29 after the arresting switch 63 opens.

The purpose of the timer mechanism 51 is to automatically arrest the motor 21 when the user manipulates the knob 11 at such a slow speed that the timer mechanism runs down (i.e., the notch 50 of the cam 49 moves into registry with the contact 48 and permits opening of the arresting switch 47) before the lobe 64A of the knob 11 opens the arresting switch 63. The timer mechanism 51 is preferably adjustable so that the user can select the maximum length of the interval which is allotted for fade-out. As explained above, the cam 49 is to turn through about 270 degrees before the notch 50 reaches the movable contact 48 in response to a counterclockwise rotation of the cam 49 from the idle position shown in FIG. 1. Of course, the motor 21 is started again as soon as the pushbutton 29 is released if the arresting switch 47 opens and causes the motor 21 to stop at a time when the movable contact 25 of the disconnecting switch 24 cannot return to open position. The control switch 65 then closes and causes the motor 21 to run until the movable contact 25 enters the recess 23.

In order to rewind that part of the film 7 which was exposed to scene light during the preceding fade-out, the user of the camera depresses the pushbutton 29 simultaneously with the knob 37 to reverse the direction of rotation of the motor 21, and the user also engages the clutch 55 so that the timer mechanism 51 rotates the cam 49 in a clockwise direction, i.e., back toward the position shown in FIG. 1. The knob 11 remains in that position in which its index 13 registers with the marker 15 so that the diaphragm vane 8 fully overlies the cutout 6a of the shutter 6. The control switch 65 opens in automatic response to depression of the pushbutton 29 whereby the auxiliary switch 67 closes to complete the motor circuit from the other pole of the battery 43, through the switch 67 and conductor 58, switch 59 and conductor 62, contacts 40, 36 and conductor 34, motor 21 and conductor 33, contacts 35, 38, conductor 42 and to the one pole of the battery. As the motor 21 drives the cam 49 in a clockwise direction, the notch 50 approaches the movable contact 60 and finally permits the arresting switch 59 to open so that the motor is arrested. If the movable contact 25 is not in registry with the recess 23, the motor 21 starts to run as soon as the pushbutton 29 is released because the control switch 65 closes; the motor is arrested automatically when the shutter 6 assumes its closed position. When the user releases the knob 37, the movable contacts 35, 36 of the reversing switch return to the positions shown in FIG. 1 and the camera is ready to start with the fade-in. The user also disengages the clutch 55 so that the motor 21 is disconnected from the timer mechanism 51. The pushbutton 29 is depressed by a finger of one hand; however, the motor 21 begins to drive the film 7 in a forward direction only when the other hand rotates the knob 11 in a counterclockwise direction back toward the position shown in FIG. 1 so that the third arresting switch 63 is free to close and to complete the motor circuit. The arrangement is preferably such that the arresting switch 63 is free to close as soon as the index 13 moves only slightly away from registry with the marker 15. The auxiliary switch 67 is closed in automatic response to depression of the pushbutton 29 so that the motor then transports the film. The fade-in is completed when the user returns the knob 11 to the illustrated position in which the diaphragm vane 8 is fully concealed behind the shutter 6. The fade-in is preferably carried out at the same speed as the fade-out, i.e., the knob 11 should be rotated at a constant speed from the illustrated position to the other end position and vice versa. From there on, the camera makes exposures in the customary way until the pushbutton 29 is released. This can result in immediate stoppage of the motor 21, or the motor continues to rotate until the movable contact 25 of the disconnecting switch 24 enters the recess of the rib 22.

In the camera of FIG. 1, the lobe 64A of the knob 11 constitutes an opening device for the arresting switch 63 and the cam 49 constitutes a common opening device for the arresting switches 47, 59. The rod 66 constitutes a mechanical motion transmitting device which automatically opens the control switch 65 in response to actuation of the starter means 26–29. The rib 22 and its recess 23 constitute a device which effects opening of the disconnecting switch 24 in a predetermined position of the shutter 6, namely, in closed position.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a motion picture camera having a shutter movable to and from a predetermined position, an electric drive for moving the shutter and including a motor; an energy source; a disconnecting switch in circuit with said motor and said energy source; starter means actuatable to close said disconnecting switch; means for effecting opening of said disconnecting switch on termination of actuation of said starter means in said predeterimned position of the shutter; arresting means including at least one arresting switch in circuit with said motor; opening means for affecting opening of said arresting switch independently of said starter means; and control switch means operative to bypass said arresting switch in response to termination of actuation of said starter means so that the motor continues to move the shutter when said arresting switch is open as long as said disconnecting switch remains in closed position.

2. An electric drive as defined in claim 1, further comprising conductor means bridging said arresting switch, said control switch being provided in said conductor means.

3. An electric drive as define in claim 1, wherein said opening means comprises a manually operated knob.

4. An electric drive as defined in claim 1, wherein said opening means comprises a timer mechanism deriving motion from said motor.

5. An electric drive as defined in claim 1, wherein said opening means comprises a rotary cam and means for rotating said cam in response to operation of said motor.

6. An electric drive as defined in claim 1, further comprising a mechanism motion transmitting connection provided between said starter means and said control switch and operative to open said control switch in response to actuation of said starter means.

7. An electric drive as defined in claim 1, wherein the shutter is rotatable about a fixed axis and is closed in said predetermined position thereof, said arresting means including a plurality of arresting switches and said opening means comprising a discrete opening device for each of said arresting switches.

8. An electric drive as defined in claim 1, wherein the shutter is rotatable about a fixed and is closed in said predetermined position thereof, said arresting means including a plurality of arresting switches and said opening means comprising a common opening device for said arresting switches.

9. An electric drive as defined in claim 8, wherein said common opening device is arranged to maintain one of said arresting switches in closed position when the other arresting switch is open, and vice versa.

10. An electric drive as defined in claim 1, wherein said opening means comprises an adjusting device for varying the opening of the shutter.

References Cited
UNITED STATES PATENTS

| | | | |
|---|---|---|---|
| 2,065,777 | 12/1936 | Weissbrodt | 352—217 |
| 3,186,319 | 6/1965 | Hochstein | 352—178X |
| 3,238,008 | 3/1966 | Krumbein et al. | 352—175X |
| 3,425,776 | 2/1969 | Mayr et al. | 352—91X |
| 3,494,691 | 2/1970 | Katsuyama | 352—91X |
| 3,512,881 | 5/1970 | Kubota | 352—176X |

LOUIS R. PRINCE, Primary Examiner

H. C. POST, III, Assistant Examiner

U.S. Cl. X.R.

352—175, 176, 178